United States Patent
Harris

(10) Patent No.: US 8,510,758 B1
(45) Date of Patent: *Aug. 13, 2013

(54) EMBEDDED DRIVER FOR AN ELECTRONIC DEVICE

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,323

(22) Filed: Jan. 3, 2012

Related U.S. Application Data

(63) Continuation of application No. 11/115,809, filed on Apr. 26, 2005, now Pat. No. 8,091,095.

(60) Provisional application No. 60/566,465, filed on Apr. 30, 2004.

(51) Int. Cl.
*G06F 9/44* (2006.01)
*G06F 15/16* (2006.01)

(52) U.S. Cl.
USPC .......................................... 719/321; 709/225

(58) Field of Classification Search
None
See application file for complete search history.

(56) References Cited

U.S. PATENT DOCUMENTS

| | | | |
|---|---|---|---|
| 6,363,423 B1 * | 3/2002 | Chiles et al. | 709/224 |
| 6,826,617 B1 | 11/2004 | Ansell et al. | |
| 7,191,153 B1 | 3/2007 | Braitberg et al. | |
| 7,237,101 B1 | 6/2007 | Dono et al. | |
| 7,325,236 B2 | 1/2008 | Kubota | |
| 7,600,132 B1 | 10/2009 | Mahmoud | |
| 2002/0065872 A1 | 5/2002 | Genske et al. | |
| 2002/0161939 A1 | 10/2002 | Kim et al. | |
| 2003/0120624 A1 | 6/2003 | Poppenga et al. | |
| 2005/0108569 A1 | 5/2005 | Bantz et al. | |
| 2005/0138645 A1 | 6/2005 | Lu | |
| 2005/0198487 A1 | 9/2005 | Zimmer et al. | |
| 2006/0100010 A1 * | 5/2006 | Gatto et al. | 463/29 |

FOREIGN PATENT DOCUMENTS

WO 02037226 11/2000

OTHER PUBLICATIONS

Massimiliano Chiodo et al, "Hardware-Sof tware Codesign of Embedded Systems", 1994.*

* cited by examiner

*Primary Examiner* — Lechi Truong
*Assistant Examiner* — Abdou Seye
(74) *Attorney, Agent, or Firm* — Law Office of Scott C Harris, Inc

(57) ABSTRACT

An electronics module with driver information electronically associated therein. The driver information may be in a memory on the electronics module. The memory may store drivers for multiple operating systems, including a virtual machine type operating system that can be used with any processor or operating system that can run the virtual machine. The memory may alternatively store website information, e.g., an address of the website and codes to use on the website to get the right driver and to validate the hardware.

15 Claims, 2 Drawing Sheets

EMBEDDED DRIVER FOR AN ELECTRONIC DEVICE

CROSS-REFERENCE OF RELATED APPLICATIONS

This application is a continuation application of U.S. Ser. No. 11/115,809 filed Apr. 26, 2005, now U.S. Pat. No. 8,091,095 issued Jan. 3, 2012, which claims priority from provisional application No. 60/566,465, filed Apr. 30, 2004. The disclosures of these parent applications are hereby incorporated by reference, in their entirety.

BACKGROUND

Electronic devices, especially those for use in computers, often require a driver file. The driver provides information that allows components of the computer and/or operating system to communicate with the electronic device. For example, taking the most common computers and architecture based computer using a Microsoft™ operating system, the operating system often includes drivers for the most common devices, with other drivers being installed from a disk. Plug-and-play operating systems allow the operating system to automatically find the device, and if a driver is available, to automatically install that driver.

When devices such as network cards or video cards are sold, they often include a driver disk to use in installing the device.

Driver disks may be inconvenient, for many reasons. It adds cost to the device, since it is an extra item that needs to be added to the package. It is easy to lose the disk. Some computers, especially small sized computers, do not have internal drives for disks.

The drivers are also often maintained on a web site. However, this requires the owner of the device to find and navigate that web site in order to determine the right location, download the driver, and install it. However, this presupposes that the user has Internet access. For example, if the driver is for a display module or a network driver, the user may not have Internet access, or even computer access, prior to the installation of the hardware.

SUMMARY

The present disclosure describes a system for embedding a driver within the actual hardware, e.g. on the card itself. According to an aspect, a number of different kinds of drivers and driver types are embedded within some hardware that is located on the card. According to another aspect, web site information is maintained, as well as write information, enabling the most recent driver to be written into special parts of the card.

DETAILED DESCRIPTION

Figure 1:
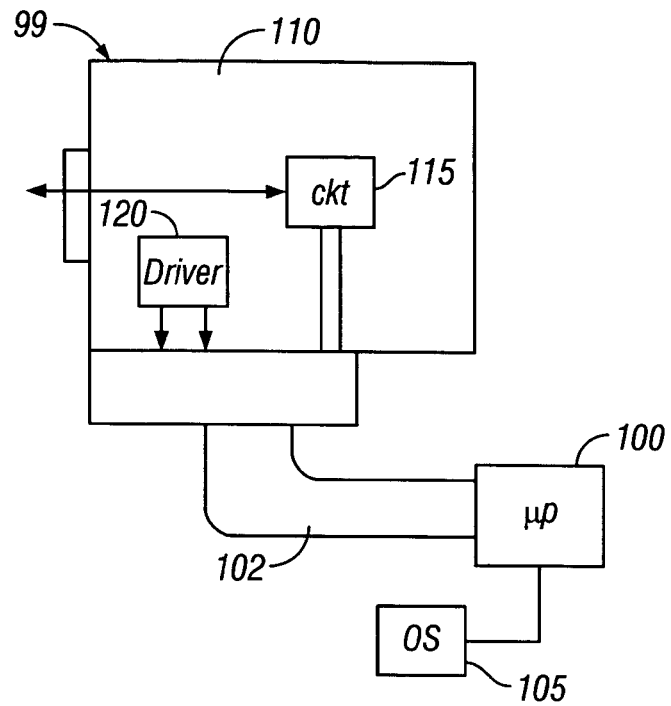
FIG. 1 shows a block diagram of the circuit in which the driver can be used.

An embodiment is shown in FIG. 1. A personal computer 99 is formed by a number of hardware devices, with only the microprocessor 100 being shown. Microprocessor 100 may by itself, or through an auxiliary chip, drive an expansion bus, here the PCI bus 102. In the example given, the microprocessor 100 is running an operating system shown as 105 which may be a plug-and-play type operating system, e.g., one available from Microsoft.

A circuit card 110 includes some expansion capabilities via hardware 115. The expansion capabilities can be for example network capabilities display capabilities for any other type of capabilities. However, in order for the operating system 105 and microprocessor 100 to use the capabilities of circuit 115, there must be a file that describes the characteristics of the circuit 115. A driver is typically used for this purpose.

Figure 2:
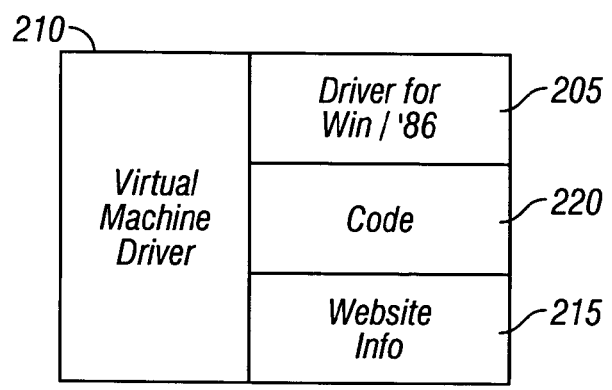
FIG. 2 shows the architecture within the memory shown in FIG. 1.
Figure 3:
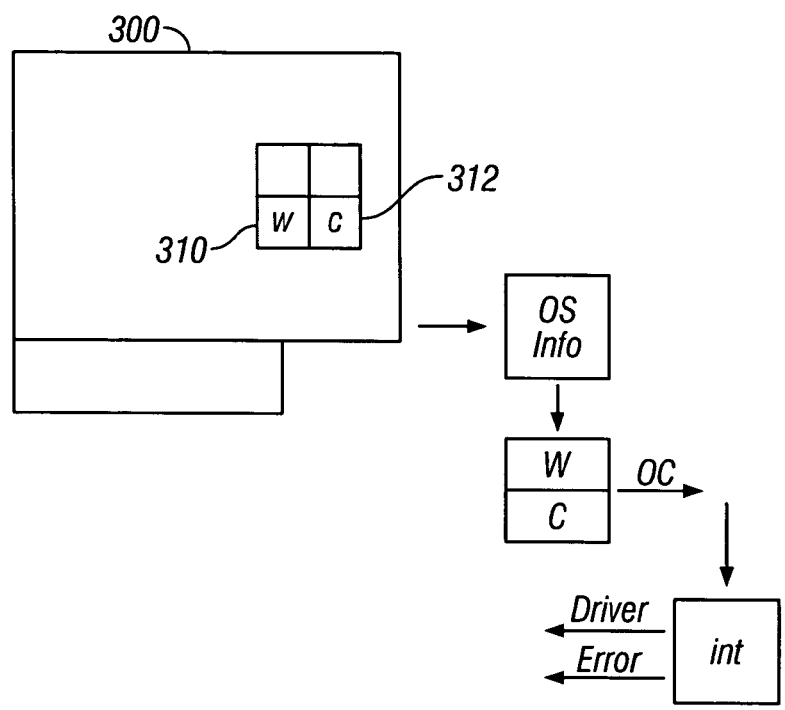
FIG. 3 shows an operational flow of carried out by the circuit of FIG. 1.

In this environment, a special memory portion 120 is also located on the card 110. The memory 120 may be a combination of read-only memory and rewritable memory. The specific architecture within driver memory 120 may be as shown in FIG. 2. In a first portion, this may include a driver 205 for the most commonly used operating system, here the Windows x86 operating system. This driver may be stored in read only memory or rewritable memory. Another driver, 210, may be a virtual machine driver. A virtual machine driver according to this aspect may be a driver that was written for a hypothetical computer environment, e.g., a hypothetical processor and/or operating system, e.g., a processor such as for the Java virtual machine. Since the driver will run on this virtual processor, any computer which can run the virtual machine simulator can also run the hardware 115 using this driver. Certain kinds of virtual machine processing is known.

Another portion of the memory shown as 215 includes website information that is information pointing to a website of the board manufacturer. This may be a link to the most recent version of the driver for the card. Also a hardwired portion 220 may be provided, with a code. This code may represent information about the specific hardware, including a serial number. The website can review this code to determine the proper driver to be returned. Also, this code can be used to prevent the use of so-called gray goods, as explained in another embodiment described herein.

In operation, the operating system, when looking for a driver for the device, looks first into the driver chip contents 120. If an appropriate driver is obtained from those contents, then that driver is used to operate the circuit 115. If no proper driver is obtained, then the system investigates whether a virtual machine driver is available, and if not whether website information is available. In this way, no external drivers may need to be installed.

In another embodiment, the Virtual Machine driver is installed as a temporary measure, to get the hardware working well enough so that the computer can otherwise operate, to allow finding a more specific driver. As an alternative to a Virtual machine driver, any generic driver can be used; that is any driver that may allow driving the hardware in many different environments.

In another embodiment, a system is formed that can prevent counterfeiting and gray goods. According to this system, it is contemplated that a special driver for the device is necessary for each installation. The device includes an onboard memory including website information shown as 310, and a special code shown as 312. The code represents the source of goods, that is it represents at least the serial number of the device and its authorized countries.

When the operating system installs the device, it follows the steps described herein. First, in order to obtain a driver, the operating system gets the information from the chip 300. The information includes a link to a website of the manufacturer. The operating system does not maintain any kind of driver for this device, but rather relies solely on the website to provide the driver. Alternatively, the operating system may have a driver, but requires the website to validate either the driver, or some running characteristic of the hardware.

The operating system provides both the information and the code to the website. In addition, the website determines from the mode of access, where the request is coming from. For example, this may be done by reverse DNS lookup or other features of determining the location from which the access was initiated. The website then consults its internal database to determine whether the information about the specific hardware matches with the location being requested. If so, it returns a driver via a download to the operating system for use in driving the hardware. If not, the website determines an error, which may include information indicating that the hardware is being used outside of its desired location.

In order to ensure that the hardware would still be usable if the manufacturer went out of business, either a driver, or a special unlock code, could be placed in escrow.

Other implementations are within the disclosed embodiment.

What is claimed is:

1. A method of operating a device in a computer comprising:
   operating a first circuit from the computer using a first driver which provides a first functionality;
   testing said first circuit from said computer to validate said first circuit; and
   only if said first circuit is validated by said testing, then operating said first circuit using a second driver which provides second functionality;
   wherein said first driver is stored in a memory, associated with said circuit, and within a same physical package as said circuit;
   wherein said memory also stores information about at least one website address, and using said information about at least one website address for accessing a web site that is based on said website address for said testing;
   wherein said memory also stores a circuit code identifying said circuit, and wherein said testing comprises presenting said code to said website and where said circuit is prevented from only certain ones of its operations without receiving a validation of said circuit code from said website.

2. The method as in claim 1, wherein said testing receives said validation via a download of said second driver.

3. The method as in claim 1, wherein said first functionality only allows certain parts of its operations, and said second functionality provides more parts of its operations.

4. The method as in claim 1, wherein said validating also includes sending information indicative of a current location of said first circuit.

5. A device for use in a computer comprising:
   a circuit which is operable from the computer to carry out operations; and
   a memory, associated with said circuit, and within a same physical package as said circuit, storing a first driver file that is used for said computer to operate said circuit,
   testing said circuit from said computer to validate said circuit; and
   only if said circuit is validated by said testing, then operating said circuit using a second driver which provides second functionality,
   wherein said memory also stores information about at least one website address, and said computer uses said information about said at least one website address for accessing a web site that is based on said website address for said validation, wherein said memory also stores a circuit code identifying said circuit, and wherein said validation comprises presenting said code and where said circuit is prevented from only certain ones of its operations without receiving a validation of said circuit code.

6. The device as in claim 5, wherein said circuit code also includes an indication of a location where the circuit is allowed to operate, and is validated only when operating in said location where said circuit is allowed to operate.

7. The device as in claim 5, wherein said memory is attached to a same physical package as said circuit.

8. The device as in claim 5, wherein said memory stores at least one generic driver that operates for multiple operating systems.

9. The device as in claim 5, wherein said validation causes download of a second driver, and where said second driver enables said circuit to carry out more of said operations.

10. The device as in claim 5, wherein said validation also includes sending information indicative of a current location of said circuit.

11. The device as in claim 10, wherein said information includes domain name system, DNS, information.

12. A system, comprising:
   a computer connected to internet;
   said computer receiving information from a remote electronic device over the internet, where said electronic device includes electronic circuitry thereon;
   said computer receiving a validation request from said electronic device, determining information about a location from which validation is requested, and determining whether said electronic device is authorized to be operated in said location from which the validation is requested; and
   returning validation information to said electronic circuit that is required by said electronic circuitry to work completely only if said electronic device is determined to be authorized,
   wherein said information received including information from a memory on said electronic circuitry, said information including a circuit code in said memory identifying at least one circuit;
   wherein said memory also stores information about at least one website address, and using said information about the at least one website address for accessing a website that is based on said website address for a testing; and
   wherein said testing comprises presenting said code to said website and where said circuit is prevented from only certain ones of its operations without receiving a validation of said circuit code from said website.

13. The system as in claim 12, wherein said computer looks up said circuit code in an internal database, and determines if a location for said circuit code matches said location from which validation is requested, and returns said validation only if said location for said circuit code matches said location from which validation is requested.

14. The system as in claim 12, wherein said validation information includes an authorized driver for said device.

15. The system as in claim 12, said information received includes information indicative of a location of said electronic device.

* * * * *